United States Patent [19]

Markley

[11] Patent Number: 4,527,965

[45] Date of Patent: Jul. 9, 1985

[54] LUBRICATION MEANS FOR CYCLICALLY DISCHARGING LUBRICANT INTO A FLUID WORKING CHAMBER

[75] Inventor: George L. Markley, Montour Falls, N.Y.

[73] Assignee: Ingersoll-Rand Company, Woodcliff Lake, N.J.

[21] Appl. No.: 615,083

[22] Filed: May 29, 1984

[51] Int. Cl.³ .................... F01C 21/04; F01M 1/08; F16N 7/34

[52] U.S. Cl. ........................................ 418/88; 418/97; 184/55 A; 184/56 A

[58] Field of Search ................ 418/88, 97, 100; 417/438; 184/55 R, 55 A, 56 R, 56 A

[56] References Cited

U.S. PATENT DOCUMENTS 1,606,758 11/1926 Greene, Jr. .................... 184/56 R
2,341,328 2/1944 Milbank ........................ 184/55 R

FOREIGN PATENT DOCUMENTS 868472 5/1961 United Kingdom ............ 184/55 R

Primary Examiner—John J. Vrablik
Attorney, Agent, or Firm—B. J. Murphy

[57] ABSTRACT

The invention comprises an arrangement, for use particularly in connection with a rotary displacement machine such as an air compressor, in which the fluid (air) compressed in the machine is employed to supply lubricant cyclically to the mating or coacting surfaces of the confined rotary piston and the walls of the compression chamber. A lubricator valve, having a translating piston and integral stem, is employed to extract oil from a repository supplied by an oil pump, and introduce it into a tapped-off compressed air line for pressurized injection into the compressor.

31 Claims, 7 Drawing Figures

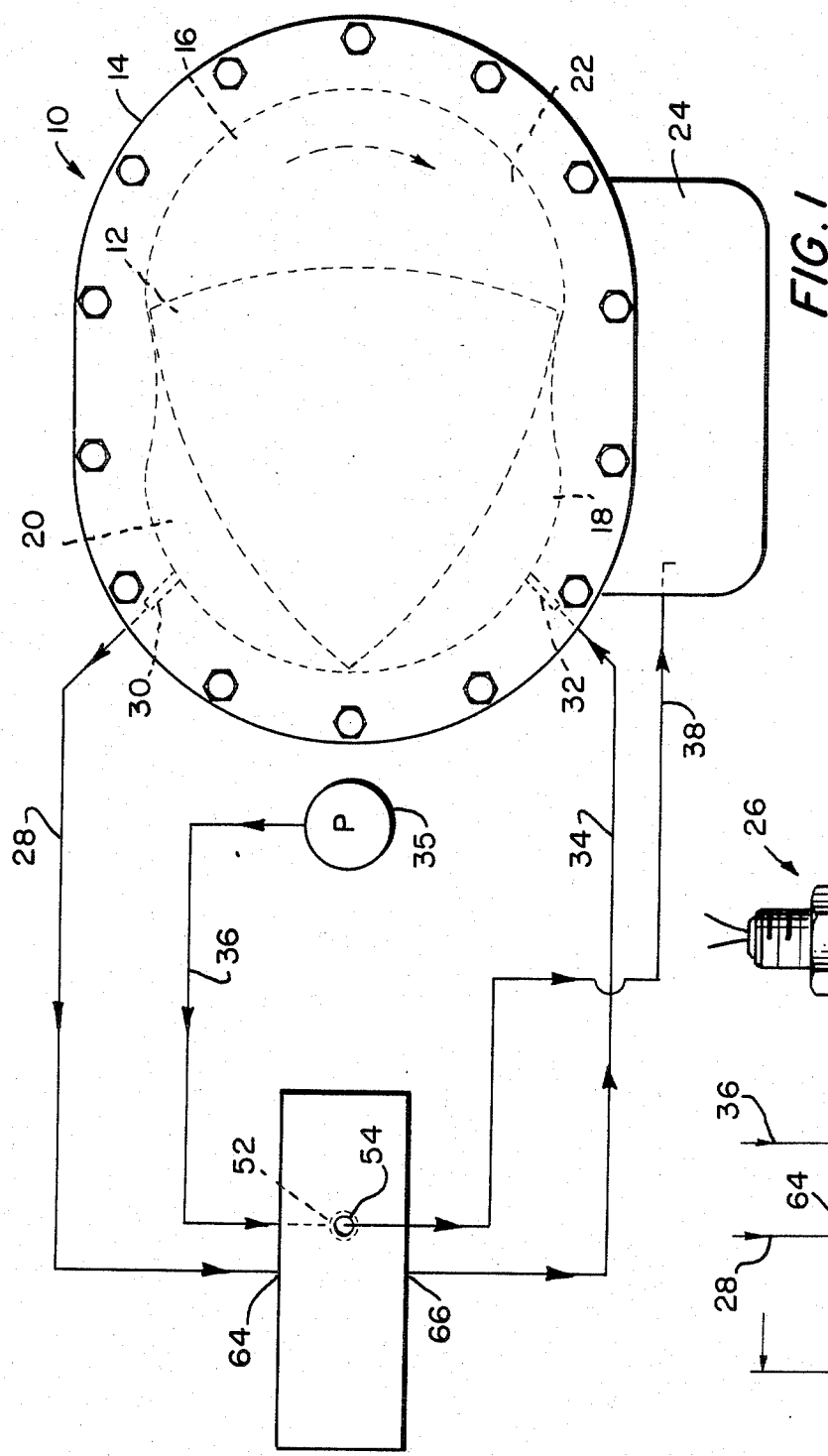
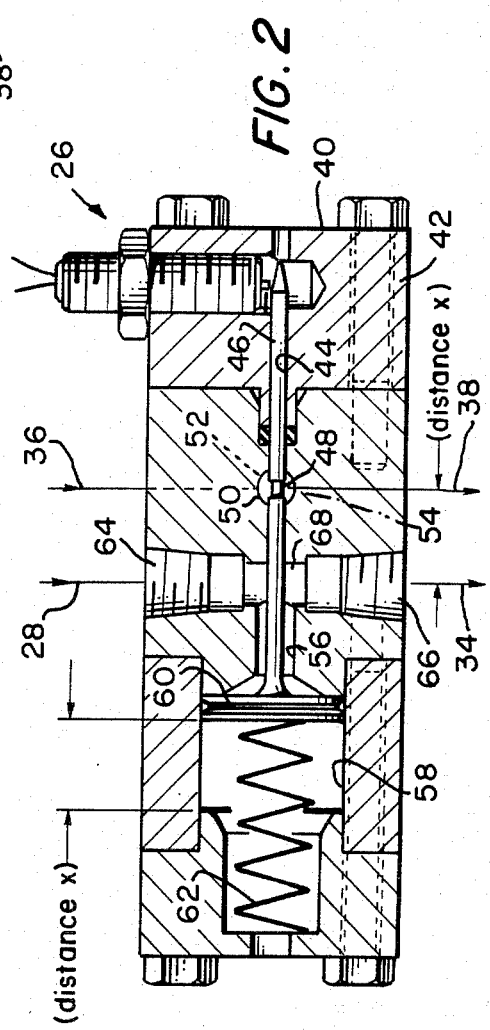
FIG. 1
FIG. 2

LUBRICATION MEANS FOR CYCLICALLY DISCHARGING LUBRICANT INTO A FLUID WORKING CHAMBER

This invention pertains to lubricating means for machinery, and in particular to lubricating means having especial utility in a positive displacement machine, such as an air compressor, or engine, in which the piston operates in cycles to define repetitive compressed gas volumes.

It is an object of this invention to set forth, in a machine such as a gas compressor, gas expander, engine, pump, or the like, having a piston movably disposed within a chamber in which at least a first portion of said chamber defines an inlet area for admitting thereinto a fluid having the properties of a given velocity, a given volume, and a given pressure, and a second portion of said chamber defines a fluid-working area in which such admitted fluid has at least one of the properties thereof altered by interaction of surfaces of said chamber and said movable piston, means for lubricating said surfaces, comprising first means for providing a source of lubricant under pressure; a device having means comprising a repository for confining therein a volume of lubricant conducted thereto, and having means, operative in response to fluid under pressure addressed thereto, for moving lubricant from said repository to a lubricant-discharging location in said device; one conduit means, communicating said first means and said repository, for conducting lubricant to said repository; another conduit means, communicating one of said areas with said lubricant-moving means, for conducting pressured fluid from said one area and addressing the same to said latter means to effect operation thereof; and a further conduit means, communicating the other of said areas with said lubricant-discharging location, for conducting lubricant from said latter location into said other area for lubricating said surfaces.

It is another object of this invention to disclose, in a machine, such as a gas compressor, gas expander, engine, pump, or the like, having a piston, disposed within a chamber, for cyclic movement thereof within said chamber, in which at least a first portion of said chamber defines an inlet area for cyclically admitting thereinto a fluid having a given pressure, and a second portion of said chamber defines a fluid-working area in which such admitted fluid has the pressure thereof varied by cyclically repetitive interaction of surfaces of said chamber and said movable piston, means for lubricating said surfaces, in timed, cyclically repetitive sequences related to cyclic movement of said piston, comprising first means for providing a source of lubricant under pressure; a device having means comprising a repository for confining therein a volume of lubricant conducted thereto, and having means repetitively operative, in response to fluid under varying pressure repetitively addressed thereto, for moving lubricant from said repository to a lubricant-discharging location in said device; one conduit means, communicating said first means and said repository, for conducting lubricant to said repository; another conduit means, communicating said second portion of said chamber with said lubricant-moving means, for repetitively conducting varying-pressured fluid, cyclically, from said second portion and addressing such varying-pressure fluid to said latter means to effect a corresponding cyclic operation thereof; and a further conduit means, communicating said first portion of said chamber with said lubricant-discharging location, for conducting lubricant, cyclically, from said latter location into said first portion for lubricating said surfaces.

Yet, another object of this invention comprises, for retrofitting thereof to a machine, such as a gas compressor, gas expander, engine, pump, or the like, having a piston disposed within a chamber for cyclic movement thereof within said chamber, in which at least a first portion of said chamber defines an inlet area for cyclically admitting thereinto a fluid under a given pressure, and a second portion of said chamber defines a fluid-working area in which such admitted fluid has the pressure thereof varied by cyclically repetitive interaction of surfaces of said chamber and said movable piston, means for lubricating said surfaces in timed, cyclically repetitive sequences to cyclic movement of said piston, comprising a device having means comprising a repository for confining therewithin a volume of lubricant conducted thereto, and having means repetitively operative, in response to fluid under varying pressure repetitively addressed thereto, for moving lubricant from said repository to a lubricant-discharging location in said device; means for conducting lubricant under pressure, from a source thereof, to said repository; first conduit means communicating with said lubricant-moving means for conducting fluid under pressure thereto to effect operation thereof; said first conduit means having means for coupling thereof in fluid communication with said second piston of said chamber for conducting cyclically, repetitively varying pressure fluid from said second portion of said chamber to said lubricant-moving means; and second conduit means communicating with said lubricant-discharging location in said device for conducting lubricant therefrom; wherein said second conduit means has means for coupling thereof in fluid communication with said first portion of said chamber for conducting lubricant into said first portion for lubrication of said surfaces.

Further objects of this invention, as well as the novel features thereof, will become more apparent by reference to the following description taken in conjunction with the accompanying figures, in which:

FIG. 1 is a combination schematic and pictorial illustration of an embodiment of the invention in use with a rotary compressor;

FIG. 2 is a cross-sectional view of the lubricator valve employed in the embodiment of FIG. 1, the same being shown along the longitudinal axis thereof;

Figure 6:
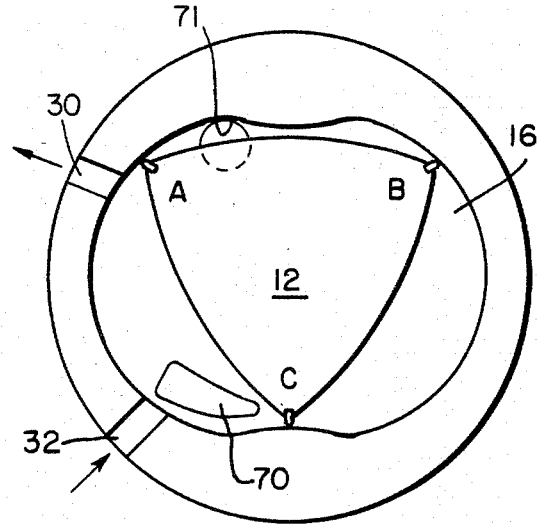
Figure 7:
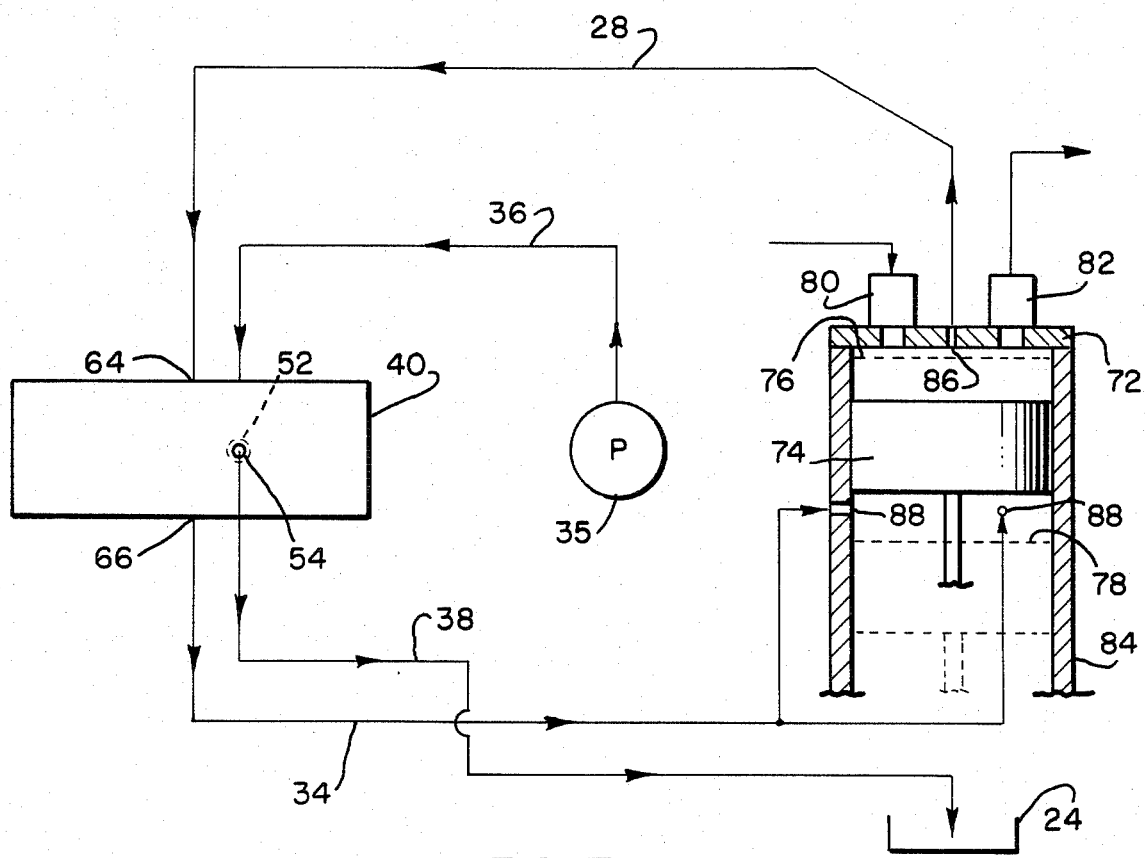

FIGS. 3, 4, 5, and 6 are sequential illustrations showing the rotor of FIG. 1 in successive, rotary dispositions within the machine; and FIG. 7 is a combination pictorial and schematic illustration of an alternative embodiment of the invention, the same being shown in use with a reciprocating compressor.

As shown in the figures, a rotary compressor 10, having a three-lobed rotor 12, comprises a housing 14 which defines a chamber 16 in which the rotor describes a rotary, epicyclic motion. During the rotation, the rotor 12 cooperates with the housing 14 to define a chamber inlet portion 18, a compression portion 20, and an expansion portion 22. The housing 14 has coupled thereto an oil sump 24 and the compressor 10 is coupled to an ancillary device 26. The latter is provided for use in injecting minute portions of lubricant into the chamber 16 for the purpose of lubricating the surfaces of the rotor 12 and the walls of the chamber 16. Device 26 is a valve coupled to the compressor 10, first by an air pressure line 28 which communicates between a fitting 30, which is in traverse a wall of the housing 14, and opens onto compression portion 20 at the one end, and line 28 opens into the valve device 26 at the other end thereof. Another fitting 32 also in traverse of the wall of the housing 14 opens onto the inlet portion 18 of the compressor 10 and is also joined, through a lubrication injection line 34, to the valve device 26. An oil pump 35, driven by the compressor 10, by means of a lubrication supply line 36 is also coupled to the valve device 26. Finally, there is a lubrication return line 38 coupled to the valve device 26 and to the sump 24.

In FIG. 2 the device 26 is shown, in greater detail, to be a piston-operated valve 40 which comprises a valve body 42 having a central channel 44 formed therein in which a stem 46 is slidably disposed. The stem 46 is substantially of a uniform diameter excepting for an intermediate portion 48 thereof having a reduced diameter. Portion 48 is normally disposed within a repository 50 formed between, and joining, an inlet oil port 52 (hidden, as it opens into the valve 40 from the rear thereof, as viewed in FIG. 2), and an outlet oil port 54 (which opens onto the front of the valve 40). The channel 44 opens onto a larger passageway 56 which further communicates with a cylinder 58 in which a piston 60 is reciprocably disposed. A compression spring 62 biases the piston 60 to the right, as viewed in FIG. 2. Inlet and outlet compressed air ports 64 and 66, respectively, open into the valve body 42, on opposite (upper and lower) sides thereof, to communicate with an oil-discharging void or area 68 within the body.

With the rotor 12 cycling within the chamber 16 the piston 60 is caused to retract and transfer oil, which is confined within the repository 50 to the oil-discharging area 68. Here, the oil will be ejected by the compressed air, and conducted, through the lubrication injection line 34, to the inlet portion 18 of the compressor 10.

Figure 3:
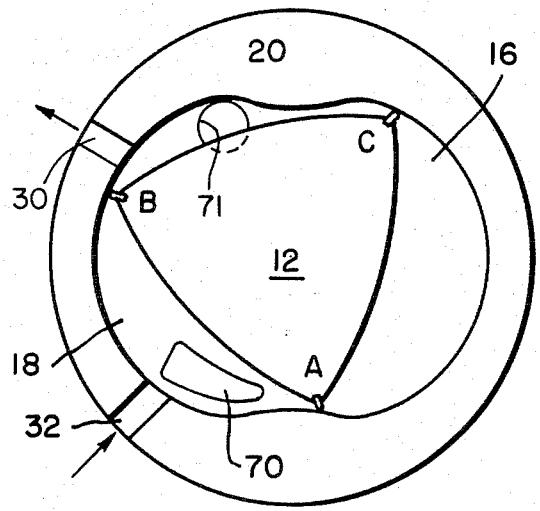
Figure 4:
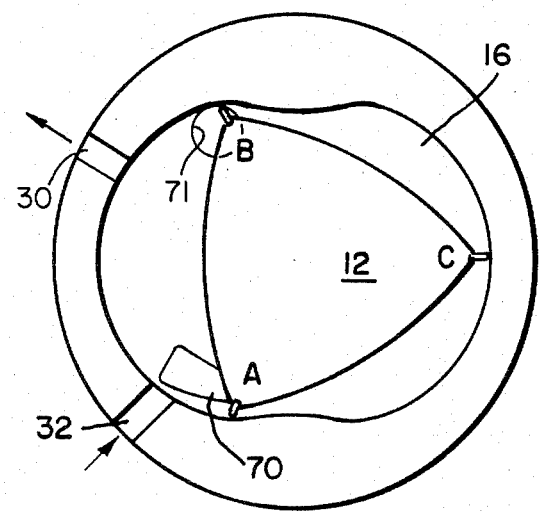
Figure 5:
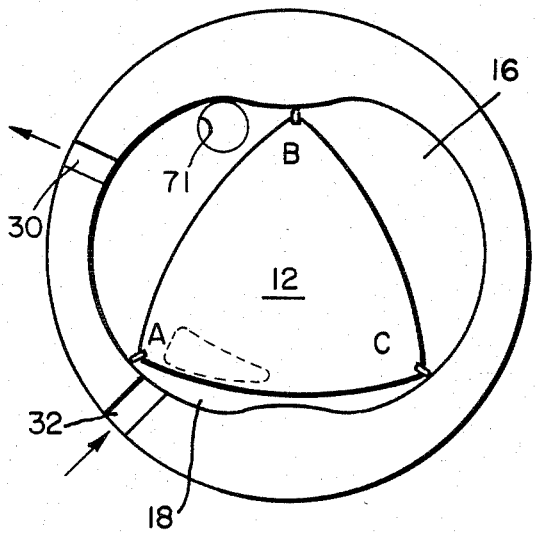

The sequence of events can be appreciated by reference to FIGS. 3 through 6 in turn. Considering the lobes "A", "B", and "C" it can be seen that, in FIG. 3, lobe "A" is so disposed in the chamber 16 that the rotor 12 has not yet closed off the inlet 70 to the compressor 10. The arrows shown in the illustration represent the lubrication injection line fitting 32 and the air pressure line fitting 30. In FIG. 4 lobe "A" of the rotor 12 is commencing to occlude the inlet 70 of the compressor 10, and in FIG. 5 it has completely closed off the inlet 70. Accordingly, the volume of fluid (air) within the chamber 16 between lobes "A" and "B" will proceed to diminish and be pressurized. As a consequence, the portion of such compressing fluid, which is tapped off via fitting 30 and line 28, will enter port 64 and passageway 56. This will cause the piston 60 to retract and carry oil, on portion 48 of the stem 46, from the repository 50 to the oil-discharging area 68 in the valve. The rotor 12 continues to rotate, and the compression portion 20 of the chamber 16 greatly reduces in volume. The compressed air product proceeds to exit via the discharge port 71. The resulting increasing air pressure in line 28, port 64 and area 68 blows the oil off the stem portion 48 and passes it through the port 66 and the lubrication injection line 34 to the fitting 32 from whence the oil is expelled into the inlet portion 18 of the compressor 10. In FIG. 6, the rotor 12 has moved on to a further positioning in which lobe "A" has passed by the fitting 30. Now then, fittings 30 and 32 and ports 64 and 66 share a common ambient or inlet pressure; as a consequence the spring 62 returns the piston 60 to the normal (FIG. 2) disposition. The reduced or intermediate stem portion 48 returns to interpositioning, between the inlet oil port 52 and the outlet oil port 54, in the repository 50, to pick up another charge of lubricant. It will be understood, then, that each time the rotor 12 describes a one hundred and twenty degree rotation a new charge of oil is injected into the compressor 10.

While the invention has particular utility in rotary machines, it is also applicable to reciprocating machines, and FIG. 7 illustrates an embodiment thereof so employed. In this, the same valve 40 and pump 35 are employed, but here the machine is a reciprocating air compressor 72, in which the piston 74 travels from a first positioning 76, which corresponds to its top dead center, to a second positioning 78, corresponding to the piston's bottom dead center. Compressor 72 has the conventional inlet and discharge valves 80 and 82 mounted atop the cylinder 84, and they function in the conventional manner. A minute aperature 86 is formed in the top of the cylinder 84 to receive a fitting to accommodate the air pressure line 28 (FIG. 1). However, to admit the lubricant into the cylinder 84 for lubrication three (only two are visible) minute holes 88, for ejection fittings 32 (FIG. 1), are formed through the wall of the cylinder 84 intermediate the first and second positionings 76 and 78 of the piston 74. In the same manner as explained in connection with the embodiment of FIG. 1, the reciprocation of the piston 74 in the cylinder 84 will cause the fluid (air) pressure to inject oil into the cylinder. The oil will pass from the valve 40 and through the lubricating injection line 34 into the three holes 88 in the cylinder 84 to lubricate the walls of the cylinder and the outer surfaces of the piston 74.

Machines, i.e., gas compressors, engines, expanders, and the like, of course, can be originally fabricated with the instant invention incorporated therewith. Alternatively, the invention can be retrofitted to existing machines. Such is simply accomplished by providing the valve device 26, lines 28, 34, 36 and 38, and fittings 30 and 32, and (a) setting the fittings in traverse of the machine housing, and (b) coupling the lines to the fittings, the machine sump 24, and pump 35, as shown in FIG. 1 (or FIG. 7).

While I have described my invention in connection with specific embodiments thereof, it is to be clearly understood that this is done only by way of example, and not as a limitation to the scope of my invention, as set forth in the objects thereof and in the appended claims.

I claim:

1. In a machine, such as a gas compressor, gas expander, engine, pump, or the like, having a piston movably disposed within a chamber in which at least a first portion of said chamber defines an inlet area for admitting thereinto a fluid having the properties of a given velocity, a given volume, and a given pressure, and a second portion of said chamber defines a fluid-working area in which such admitted fluid has at least one of the properties thereof altered by interaction of surfaces of said chamber and said movable piston, means for lubricating said surfaces, comprising:

first means for providing a source of lubricant under pressure;

a device having means comprising a repository for confining therein a volume of lubricant conducted thereto, and having means movable, along a given axis which traverses said repository, in response to fluid under pressure addressed thereto, for carrying lubricant along said axis from said repository to a lubricant-discharging location, in said device which is axially spaced apart from said repository;

one conduit means, communicating said first means and said repository, for conducting lubricant to said repository;

another conduit means, communicating one of said areas with said lubricant-carrying means, for conducting pressured fluid from said one area and addressing the same to said latter means to effect lubricant-carrying movement thereof; and a further conduit means, communicating the other of said areas with said lubricant-discharging location, for conducting lubricant from said latter location into said other area for lubricating said surfaces.

2. Lubricating means, according to claim 1, wherein:
said another conduit means and said further conduit means are in common communication via said lubricant-discharging location.

3. Lubricating means, according to claim 1, wherein:
said device comprises a housing;
said repository comprises a first cavity formed in said housing;
said lubricant-discharging location comprises a second cavity formed in said housing; and
said housing has a channel formed therein which communicates between said cavities.

4. Lubricating means, according to claim 3, wherein:
said lubricant-carrying means comprises a stem slidably disposed in said channel.

5. Lubricating means, according to claim 4, wherein:
said channel has a given diameter; and
said stem has (a) a first diameter, substantially corresponding with said given diameter, defining a substantially sealing interface with said channel, and (b) a relieved portion, formed therein, having a second diameter, smaller than said first diameter;
said relieved portion comprising a lubricant collector.

6. Lubricating means, according to claim 5, wherein:
said housing further has a cylindrical bore formed therein, and a piston reciprocably disposed in said bore;
said piston is integral with said stem;
said bore has a given length;
said piston is movable, in said bore, through a given distance along said length; and
centers of said cavities are spaced apart the aforesaid same given distance.

7. Lubricating means, according to claim 6, wherein:
said piston is movable in said bore, as aforesaid, between first and second spaced-apart dispositions; and further including
means in said bore resiliently biasing said piston in one of said first and second dispositions; and wherein
said relieved portion of said stem is disposed in said center of one of said cavities when said piston is in said one disposition, and is disposed in said center of the other of said cavities when said piston is in the other of said first and second dispositions.

8. Lubricating means, according to claim 6, wherein:
said housing further has a passageway formed therein which opens, at opposite ends thereof, onto one of said cavities and onto said bore;
said housing also has a pair of ports formed therein both of which open onto said one cavity;

said another conduit means comprises a conduit coupled to one of said ports; and
said further conduit means comprises a conduit coupled to the other of said ports.

9. Lubricating means, according to claim 3, wherein:
said housing also has a given port formed therein which opens onto said repository; and
said one conduit means comprises a conduit coupled to said given port.

10. Lubricating means, according to claim 9, wherein:
said housing further has another port formed therein which also opens onto said repository; and further including
a lubricant sump; and
a conduit communicating said another port with said lubricant sump.

11. In a machine, such as a gas compressor, gas expander, engine, pump, or the like, having a piston, disposed within a chamber, for cyclic movement thereof within said chamber, in which at least a first portion of said chamber defines an inlet area for cyclically admitting thereinto a fluid having a given pressure, and a second portion of said chamber defines a fluid-working area in which such admitted fluid has the pressure thereof varied by cyclically repetitive interaction of surfaces of said chamber and said movable piston, means for lubricating said surfaces, in timed, cyclically repetitive sequences related to cyclic movement of said piston, comprising:

first means for providing a source of lubricant under pressure;

a device having means comprising a repository for confining therein a volume of lubricant conducted thereto, and having means repetitively movable, along a given axis which traverses said repository, in response to fluid under varying pressure repetitively addressed thereto, for carrying lubricant along said axis from said repository to a lubricant-discharging location in said device;

one conduit means, communicating said first means and said repository, for conducting lubricant to said repository;

another conduit means, communicating said second portion of said chamber with said lubricant-carrying means, for repetitively conducting varying-pressured fluid, cyclically, from said second portion and addressing such varying-pressure fluid to said latter means to effect a corresponding cyclic lubricant-carrying movement thereof; and a further conduit means, communicating said first portion of said chamber with said lubricant-discharging location, for conducting lubricant, cyclically, from said latter location into said first portion for lubricating said surfaces.

12. Lubricating means, according to claim 11, wherein:
said another conduit means and said further conduit means are in common communication via said lubricant-discharging location.

13. Lubricating means, according to claim 11, wherein:
said device comprises a housing;
said repository comprises a first cavity formed in said housing;
said lubricant-discharging location comprises a second cavity formed in said housing; and
said housing has a channel formed therein which communicates between said cavities.

14. Lubricating means, according to claim 13, wherein:
   said lubricant-carrying means comprises a stem slidably disposed in said channel.

15. Lubricating means, according to claim 14, wherein:
   said channel has a given diameter; and
   said stem has (a) a first diameter, substantially corresponding with said given diameter, defining a substantially sealing interface with said channel, and (b) a relieved portion, formed therein, having a second diameter, smaller than said first diameter;
   said relieved portion comprising a lubricant collector.

16. Lubricating means, according to claim 15, wherein:
   said housing further has a cylindrical bore formed therein, and a piston reciprocably disposed in said bore;
   said piston is integral with said stem;
   said bore has a given length;
   said piston is movable, in said bore, through a given distance along said length; and
   centers of said cavities are spaced apart the aforesaid same given distance.

17. Lubricating means, according to claim 16, wherein:
   said piston is movable in said bore, as aforesaid, between first and second spaced-apart dispositions; and further including
   means in said bore resiliently biasing said piston in one of said first and second dispositions; and wherein
   said relieved portion of said stem is disposed in said center of one of said cavities when said piston is in said one disposition, and is disposed in said center of the other of said cavities when said piston is in the other of said first and second dispositions.

18. Lubricating means, according to claim 16, wherein:
   said housing further has a passageway formed therein which opens, at opposite ends thereof, onto one of said cavities and onto said bore;
   said housing also has a pair of ports formed therein both of which open onto said one cavity;
   said another conduit means comprises a conduit coupled to one of said ports; and
   said further conduit means comprises a conduit coupled to the other of said ports.

19. Lubricating means, according to claim 13, wherein:
   said housing also has a given port formed therein which opens onto said repository; and
   said one conduit means comprises a conduit coupled to said given port.

20. Lubricating means, according to claim 19, wherein:
   said housing further has another port formed therein which also opens onto said repository; and further including
   a lubricant sump; and
   a conduit communicating said another port with said lubricant sump.

21. For retrofitting thereof to a machine, such as a gas compressor, gas expander, engine, pump, or the like, having a piston disposed within a chamber for cyclic movement thereof within said chamber, in which at least a first portion of said chamber defines an inlet area for cyclically admitting thereinto a fluid under a given pressure, and a second portion of said chamber defines a fluid-working area in which such admitted fluid has the pressure thereof varied by cyclically repetitive interaction of surfaces of said chamber and said piston, means for lubricating said surfaces in timed, cyclically repetitive sequences related to cyclic movement of said piston, comprising:
   a device having means comprising a repository for confining therewithin a volume of lubricant conducted thereto, and having means repetitively movable, along a given axis which traverses said repository, in response to fluid under varying pressure repetitively addressed thereto, for carrying lubricant along said axis from said repository to a lubricant-discharging location in said device;
   means for conducting lubricant under pressure, from a source thereof, to said repository;
   first conduit means communicating with said lubricant-carrying means for conducting fluid under pressure thereto to effect lubricant-carrying movement thereof;
   said first conduit means having means for coupling thereof in fluid communication with said chamber for conducting cyclically, repetitively varying pressure fluid from said second portion of said chamber to said lubricant-carrying means; and
   second conduit means communicating with said lubricant-discharging location in said device for conducting lubricant therefrom; wherein
   said second conduit means has means for coupling thereof in fluid communication with said first portion of said chamber for conducting lubricant into said first portion for lubrication of said surfaces.

22. In a machine, such as a gas compressor, gas expander, engine, pump, or the like, having a piston disposed within a chamber for cyclic movement thereof along a given distance within said chamber from a given location within said chamber to another location within said chamber, said chamber having means for admitting thereinto a fluid having the properties of a given velocity, a given volume, and a given pressure, and wherein such admitted fluid has at least one of the properties thereof altered by interaction of surfaces of said chamber and said movable piston as said piston moves between said given and another locations within said chamber, means for lubricating said surfaces, comprising:
   first means for providing a source of lubricant under pressure;
   a device having means comprising a repository for confining therein a volume of lubricant conducted thereto, and having means movable, along a given axis which traverses said repository, in response to fluid under pressure addressed thereto, for carrying lubricant along said axis from said repository to a lubricant-discharging area in said device;
   one conduit means, communicating said first means and said repository, for conducting lubricant to said repository;
   another conduit means, communicating one of said locations with said lubricant-carrying means, for conducting pressured fluid from said one location and addressing the same to said latter means to effect lubricant-carrying movement thereof; and
   a further conduit means, communicating a location within said chamber, which is intermediate said given and another locations, with said lubricant-discharging area, for conducting lubricant from said area into said intermediate location for lubricating said surfaces.

23. Lubricating means, according to claim 22, wherein:
said another conduit means and said further conduit means are in common communication via said lubricant-discharging area.

24. Lubricating means, according to claim 22, wherein:
said device comprises a housing;
said repository comprises a first cavity formed in said housing;
said lubricant-discharging area comprises a second cavity formed in said housing; and
said housing has a channel formed therein which communicates between said cavities.

25. Lubricating means, according to claim 24, wherein:
said lubricant-carrying means comprises a stem slidably disposed in said channel.

26. Lubricating means, according to claim 25, wherein:
said channel has a given diameter; and
said stem has (a) a first diameter, substantially corresponding with said given diameter, defining a substantially sealing interface with said channel, and (b) a relieved portion, formed therein, having a second diameter, smaller than said first diameter;
said relieved portion comprising a lubricant collector.

27. Lubricating means, according to claim 26, wherein:
said housing further has a cylindrical bore formed therein, and a piston reciprocably disposed in said bore;
said piston is integral with said stem;
said bore has a given length;
said piston is movable, in said bore, through a given distance along said length; and
centers of said cavities are spaced apart the aforesaid same given distance.

28. Lubricating means, according to claim 27, wherein:
said piston is movable in said bore, as aforesaid, between first and second spaced-apart dispositions; and further including
means in said bore resiliently biasing said piston in one of said first and second dispositions; and wherein
said relieved portion of said stem is disposed in said center of one of said cavities when said piston is in said one disposition, and is disposed in said center of the other of said cavities when said piston is in the other of said first and second dispositions.

29. Lubricating means, according to claim 27, wherein:
said housing further has a passageway formed therein which opens, at opposite ends thereof, onto one of said cavities and onto said bore;
said housing also has a pair of ports formed therein both of which open onto said one cavity;
said another conduit means comprises a conduit coupled to one of said ports; and
said further conduit means comprises a conduit coupled to the other of said ports.

30. Lubricating means, according to claim 24, wherein:
said housing also has a given port formed therein which opens onto said repository; and
said one conduit means comprises a conduit coupled to said given port.

31. Lubricating means, according to claim 30, wherein:
said housing further has another port formed therein which also opens onto said repository; and further including
a lubricant sump; and
a conduit communicating said another port with said lubricant sump.

* * * * *